H. T. CROOK.
CONNECTING ROD FOR LOCOMOTIVES.
APPLICATION FILED JAN. 10, 1913.
1,092,025. Patented Mar. 31, 1914.
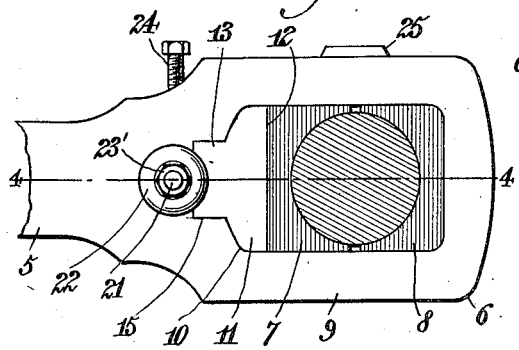
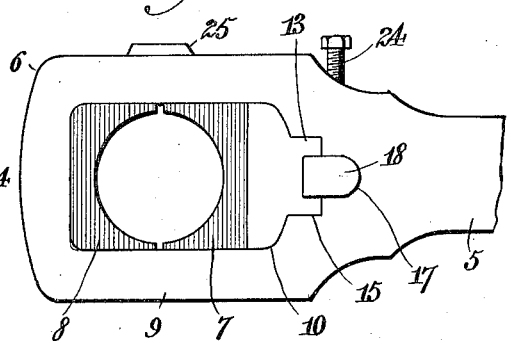
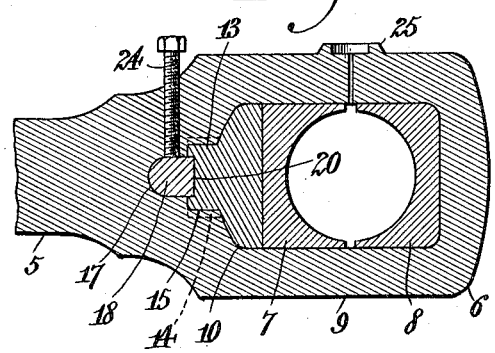
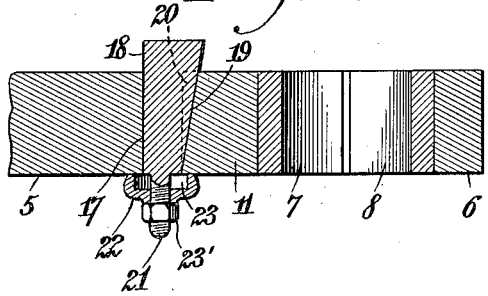
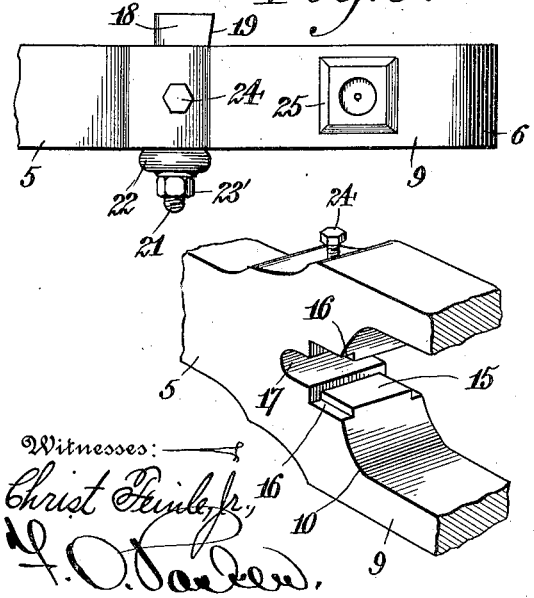
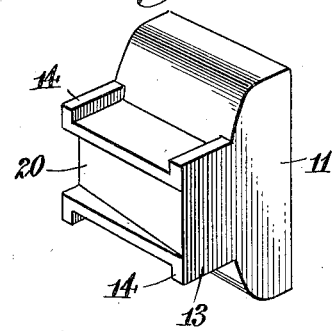
Inventor,
Henry T. Crook.
By Victor J. Evans,
Attorney.
Witnesses:

ctive view of

UNITED STATES PATENT OFFICE.

HENRY T. CROOK, OF ASHEVILLE, NORTH CAROLINA.

CONNECTING-ROD FOR LOCOMOTIVES.

1,092,025.   Specification of Letters Patent.   Patented Mar. 31, 1914.

Application filed January 10, 1913. Serial No. 741,270.

*To all whom it may concern:*

Be it known that I, HENRY T. CROOK, a citizen of the United States, residing at Asheville, in the county of Buncombe and State of North Carolina, have invented new and useful Improvements in Connecting-Rods for Locomotives, of which the following is a specification.

The invention relates to connecting rods for locomotives, and more particularly to the class of front end connecting rods for locomotives.

The primary object of the invention is the provision of a connecting rod wherein the brasses which embrace the crank pin and bear against it are readily and easily adjusted and held in such adjusted relation to the said pin so as to avoid the pounding of the connecting rod or any lost motion due to the wear of the brasses or crank pin.

Another object of the invention is the provision of a connecting rod of this character wherein the brasses are mounted in the strap heads or stud ends thereof and are capable of proper adjustment without requiring any material changes in the connecting rod ordinarily used.

A further object of the invention is the provision of a connecting rod of this character wherein the movable brass of the pair which embrace the crank pin is supported against a follower which possesses maximum bearing surface for the brass so as to avoid the wabbling or displacement of the movable brass after the same has become worn, and it is adjusted to take up wear.

A still further object of the invention is the provision of a connecting rod of this character which is extremely simple in construction, thoroughly reliable and efficient in its purpose, and inexpensive in manufacture.

Other objects will be in part obvious and in part pointed out hereinafter.

The invention accordingly consists in the features of construction, combination of elements, and arrangement of parts which will be exemplified in the construction hereinafter set forth, and the scope of the application of which will be indicated in the following claim.

In the drawings:—Figure 1 is a fragmentary side elevation of a connecting rod and brasses constructed in accordance with the invention. Fig. 2 is a similar view looking toward the opposite side thereof. Fig. 3 is a vertical longitudinal sectional view thereof. Fig. 4 is a vertical transverse sectional view on the line 4—4 of Fig. 1. Fig. 5 is a top plan view. Fig. 6 is a perspective view of the follower and gib. Fig. 7 is a perspective view of the connecting rod.

Similar reference characters indicate corresponding parts throughout the several views in the drawing.

Referring to the drawings by numerals, 5 designates a portion of the front end connecting rod used on locomotives, and 6 the stud end or strap head thereof, in which are fitted two brass journal bearings or brasses 7 and 8 respectively, which are adapted to embrace the crank pin and bear against a sliding cross head of the ordinary well-known construction. The stud end or strap head 6 of the connecting rod includes an eye strap 9 integral therewith which connects the journal bearings or brasses to the connecting rod. Heretofore in the make-up of the stud end or strap head 6 the strap 9 and the end of the connecting rod 5 to which it is attached are provided with sharp or right angular corners, whereas in the present make-up of the stud end or strap head 6 the said corners 10 are rounded so as to assure maximum strength to the stud end or strap head of the connecting rod.

The stud end or strap head of the connecting rod 5 is cut away to provide a suitable space to receive a follower 11 which has a bearing surface 12 corresponding to the outer end of the brass or journal bearing 7 so that on the adjustment of the bearings or brasses 7 and 8 the wabbling of the bearing or brass 7 is obviated when it becomes worn by reason of friction on the crank pin. This follower 11 is integral with or suitably fastened to a guide gib 13 which is formed with upper and lower guide ribs 14 and is slidably fitted in a recess 15 formed in the forward end of the connecting rod 5, the recess being provided with guide grooves 16 for receiving the ribs 14 and thereby prevent the twisting or lateral displacement of the gib 13 when shifting the follower 11 for the adjustment of the brasses, the recess 15 being in communication with a transversely disposed keyway 17 in which is mounted a wedging key 18, the latter having its wedging surface 19 working within a tapered channel or guideway 20 formed in the gib 13, so that when the said key 18 is driven home it will effect the proper adjustment of the brasses or journal bearings 7 and 8 about the crank pin so as to take up lost motion as the wear of the journal bearings or brasses occurs. The key at its smaller end portion is formed with a reduced threaded bolt stem 21 on which is mounted a collar 22, the inner face of which is formed with an annular pocket or recess 23 so that when the same is worked inwardly on the stem 21 it will accommodate the smaller end portion of the key 18 should it be necessary to drive the latter a distance whereby its larger end will occupy the key-way 17 for the proper adjustment of the brasses after the same have been severely worn.

Adjustably engaged on the threaded stem 21 is a nut 23' which works against the collar 22 and on the turning of the said nut in one direction said nut forces the key into the key-way 17 for the adjustment of the brasses and the securing of the same in their adjusted position.

Threaded in the front end portion of the connecting rod 5 is a set screw 24 which is adapted to engage the key 18 after being adjusted to lock the same and thereby avoid the working loose of the key resultant from vibrations transmitted through the connecting rod.

Mounted upon the stud end or strap head 6 of the connecting rod is an ordinary oil cup 25 which distributes oil to the crank pin in the usual well-known manner.

From the foregoing description it is thought that the construction and manner of operation of the device will be clearly understood, and therefore a more extended explanation has been omitted.

What is claimed is:—

The combination with a strap head for locomotive connecting rods having a guideway transversely disposed therein, of a pair of brasses adapted to embrace the crank pin and engageable in the strap head, a follower working against one of the brasses and having a gib extension slidable in the guideway, the walls of the guideway being formed with guide grooves, guide ribs on the gib extension and engaging in the guide grooves, the said extension being further provided with a beveled face, a wedge-shaped key engaged in the guideway and contacting with the beveled face on the extension, a cup-shaped washer on the key and receiving the narrower portion thereof, and a lock nut threaded on the key and working against the washer.

In testimony whereof I affix my signature in presence of two witnesses.

HENRY T. CROOK.

Witnesses:
E. EDMONSTON, Jr.,
FRANK O. TANKER.

---

Copies of this patent may be obtained for five cents each, by addressing the "Commissioner of Patents, Washington, D. C."